(12) United States Patent
Lange et al.

(10) Patent No.: US 8,814,224 B2
(45) Date of Patent: Aug. 26, 2014

(54) ENCLOSURE SUSPENSION SYSTEM WITH COMPRESSION FITTING

(75) Inventors: Timothy G. Lange, Champlin, MN (US); Jamie M. Livgard, Big Lake, MN (US); William J. Nepsha, Zimmerman, MN (US); Nathan P. Espinosa, Lino Lakes, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 642 days.

(21) Appl. No.: 12/944,548

(22) Filed: Nov. 11, 2010

(65) Prior Publication Data

US 2011/0140416 A1 Jun. 16, 2011

Related U.S. Application Data (60) Provisional application No. 61/260,333, filed on Nov. 11, 2009.

(51) Int. Cl.
  *F16L 21/02* (2006.01)
  *F16L 19/06* (2006.01)
  *F16L 19/08* (2006.01)

(52) U.S. Cl.
  USPC ............ 285/342; 285/113; 285/339; 285/374

(58) Field of Classification Search
  USPC .................................. 285/113, 339, 342, 374
  See application file for complete search history.

(56) References Cited

U.S. PATENT DOCUMENTS

| | | | |
|---|---|---|---|
| 1,181,856 A * | 5/1916 | Downer ........................ 285/214 |
| 2,950,892 A | 8/1960 | Rick | |
| 3,204,988 A * | 9/1965 | Dunton et al. .................. 285/40 |
| 3,485,517 A | 12/1969 | Howe | |
| 3,989,283 A | 11/1976 | Pepper | |
| 4,022,499 A | 5/1977 | Holmes et al. | |
| 4,194,770 A | 3/1980 | Richards | |
| 4,260,182 A | 4/1981 | Bruner | |
| 4,452,414 A | 6/1984 | Ansems | |
| 4,603,463 A | 8/1986 | Wolbert et al. | |
| 4,657,217 A | 4/1987 | Kiesel et al. | |
| 4,714,222 A | 12/1987 | Kiesel et al. | |
| 5,093,957 A | 3/1992 | Do | |
| 5,127,617 A | 7/1992 | Bergetz | |
| 5,217,261 A | 6/1993 | DeWitt et al. | |
| 5,456,502 A | 10/1995 | Sharp | |
| 5,460,459 A | 10/1995 | Morgan | |
| 5,564,667 A | 10/1996 | Copeland et al. | |
| 6,095,467 A * | 8/2000 | Neuhof ...................... 248/278.1 |
| 6,488,318 B1 * | 12/2002 | Shim ............................ 285/322 |
| 6,554,238 B1 * | 4/2003 | Hibberd .................... 248/278.1 |
| 6,761,344 B2 | 7/2004 | Welling et al. | |
| 6,851,728 B2 * | 2/2005 | Minami ....................... 285/339 |
| 6,863,252 B2 * | 3/2005 | Bosson ...................... 248/278.1 |
| 7,118,080 B2 | 10/2006 | Chan et al. | |

(Continued)

*Primary Examiner* — Terrell McKinnon
*Assistant Examiner* — Michael McDuffie
(74) *Attorney, Agent, or Firm* — Quarles & Brady LLP (57) ABSTRACT

Embodiments of the invention provide a suspension system for supporting an enclosure. The system includes a compression fitting that couples an enclosure mounting assembly to a hollow connector tube and provides a substantially sealed pathway between the enclosure mounting assembly to the hollow connector tube. The compression fitting includes at least one coupling body and at least one compression nut. The compression nuts are tightened around portions of the coupling bodies to secure end portions of the enclosure mounting assembly and the hollow connector tube within the coupling bodies.

19 Claims, 8 Drawing Sheets

(56) References Cited

U.S. PATENT DOCUMENTS

| | | | |
|---|---|---|---|
| 7,152,488 B2 * | 12/2006 | Hedrich et al. | 73/849 |
| 7,264,212 B2 * | 9/2007 | Hung | 248/282.1 |
| 7,364,127 B2 | 4/2008 | Huang | |
| 7,374,138 B2 | 5/2008 | Marshall | |
| 7,395,995 B2 | 7/2008 | Chen | |
| 7,410,174 B2 * | 8/2008 | Jones et al. | 277/615 |
| 7,455,328 B2 * | 11/2008 | Chelchowski et al. | 285/323 |
| 7,487,943 B1 | 2/2009 | Gillespie | |
| 7,513,469 B1 | 4/2009 | Ciungan | |
| 7,604,210 B2 | 10/2009 | Oddsen, Jr. et al. | |
| 7,635,234 B2 | 12/2009 | Schindler et al. | |
| 7,748,666 B2 | 7/2010 | Oddsen, Jr. et al. | |
| 2005/0121578 A1 | 6/2005 | Asamarai et al. | |
| 2006/0196998 A1 | 9/2006 | Matteo | |
| 2008/0100996 A1 | 5/2008 | Wang | |
| 2010/0148020 A1 | 6/2010 | Wills et al. | |

* cited by examiner

ENCLOSURE SUSPENSION SYSTEM WITH COMPRESSION FITTING

RELATED APPLICATIONS

This application claims priority under 35 U.S.C. §119 to U.S. Provisional Patent Application No. 61/260,333 filed on Nov. 11, 2009, the entire contents of which is incorporated herein by reference.

BACKGROUND

Suspension systems, such as pendant arms, are used for the mounting and/or positioning of human machine interfaces (HMIs). Pendant arms can be mounted to walls, ceilings, machines, etc., and can be rotated or adjusted horizontally to provide adjustment of the HMI to a desired position. Pendant arms can be used in sanitary applications such as in the food service industry, pharmaceutical environments, manufacturing plants, and hospital environments.

Pendant arms can use tubing connected by joints or elbows. The tubing can be connected to the joints or elbows using set screws. However, the set screws do not provide a water-tight seal between the inside of the tubing and the outside environment. As a result, during, for example, a washdown procedure, water may enter into the pendant arm at the joints or elbows and contact cables being run through the tubing to the HMI.

The set screws and their respective hubs can also collect bacteria. The small parts and crevices are difficult and tedious to clean. In addition, since there is no seal between the inside of the tubing and the outside environment, the bacteria can travel into the tubing, creating a hazardous situation for food service, pharmaceutical, and hospital applications.

SUMMARY

Some embodiments of the invention provide a compression fitting for securing a coupling end portion of an enclosure suspension system component. The compression fitting includes a first coupling body which receives the coupling end portion and includes a threaded portion and a notch. The compression fitting also includes a first compression ring positioned between a portion of the coupling end portion and a portion of the first coupling body, and a first compression nut tightened over the threaded portion of the first coupling body. The first compression nut forces the first compression ring against the coupling end portion and secures a protrusion of the coupling end portion within the notch of the first coupling body to prevent rotation of the coupling end portion within the first coupling body.

Some embodiments of the invention provide a suspension system for supporting an enclosure. The system includes an enclosure mounting assembly with a first coupling portion, a connector tube with a second coupling portion, and a compression fitting. The compression fitting includes a first end and a second end and couples the enclosure mounting assembly to the connector tube by fixing the first coupling portion inside the first end of the compression fitting and fixing the second coupling portion inside the second end of the compression fitting. The compression fitting also provides a substantially sealed pathway between the first coupling portion and the second coupling portion.

Some embodiments of the invention provide a suspension system for supporting an enclosure. The system includes an enclosure mounting assembly with a first coupling portion, a support mounting assembly with a first compression fitting, and at least one hollow connector tube positioned between the enclosure mounting assembly and the support mounting assembly. A first end of the at least one hollow connector tube is coupled to the support mounting assembly by the first compression fitting, where the first compression fitting provides a substantially sealed pathway between the support mounting assembly and the at least one hollow connector tube. The system also includes a second compression fitting that couples the enclosure mounting assembly to a second end of the at least one hollow connector tube. The second compression fitting provides a substantially sealed pathway between the first coupling portion and the at least one hollow connector tube.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
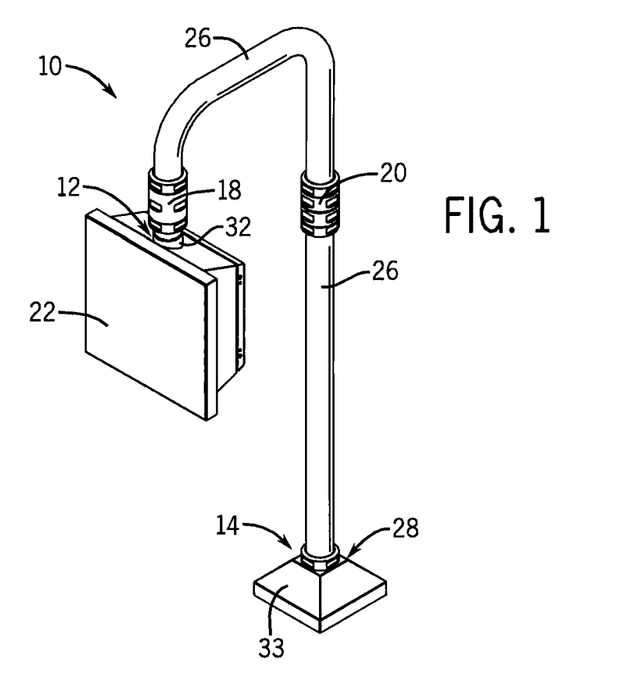
FIG. 1 is a perspective view of a suspension system according to one embodiment of the invention.
Figure 2:
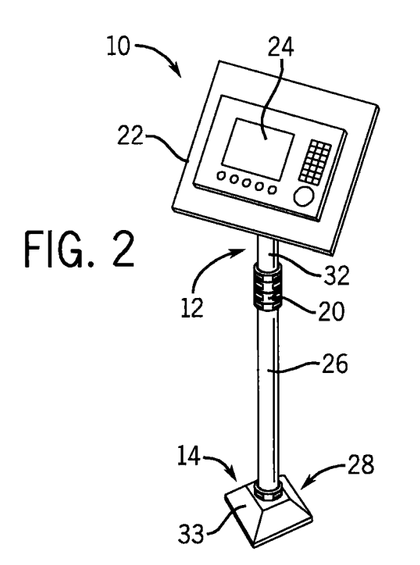
FIG. 2 is a perspective view of a suspension system according to another embodiment of the invention.
Figure 3:
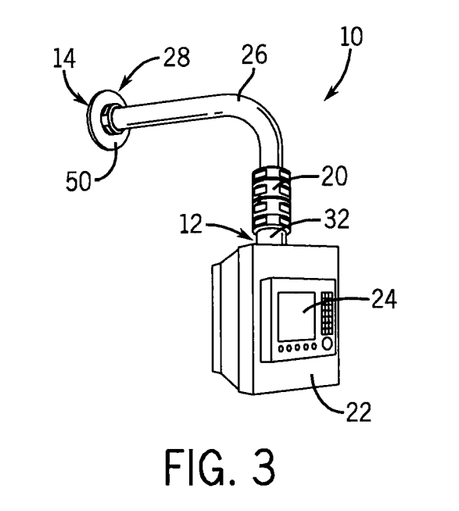
FIG. 3 is a perspective view of a suspension system according to yet another embodiment of the invention.

FIG. 1 illustrates an enclosure suspension system 10 according to one embodiment of the invention. The suspension system 10 can include an enclosure mounting assembly 12, a support mounting assembly 14, and one or more fittings or couplings, such as fixed couplings 18 (as shown in FIGS. 5A-6B) and/or swivel couplings 20 (as shown in FIGS. 7A-8C). The enclosure mounting assembly 12 can substantially hold or be coupled to an enclosure 22 including an HMI 24 or a touch screen computer, as shown in FIGS. 2 and 3. The enclosure mounting assembly 12 and the support mounting assembly 14 can be coupled together via the couplings 18, 20, as well as connector tubes 26, as shown in FIGS. 1-3.

In one embodiment, a connector tube 26 can be directly coupled to the support mounting assembly 14, as shown in FIGS. 1-3. The connector tube 26 can be coupled to the enclosure mounting assembly 12 via a single coupling 18, 20, as shown in FIGS. 2 and 3, or via one or more additional connector tubes 26 coupled together via one or more couplings 18, 20, a shown in FIG. 1. In some embodiments, the support mounting assembly 14 and the connector tubes 26 coupled together can form a support assembly for the enclosure 22, where the support assembly is coupled to the enclosure mounting assembly 12.

Figure 4A:
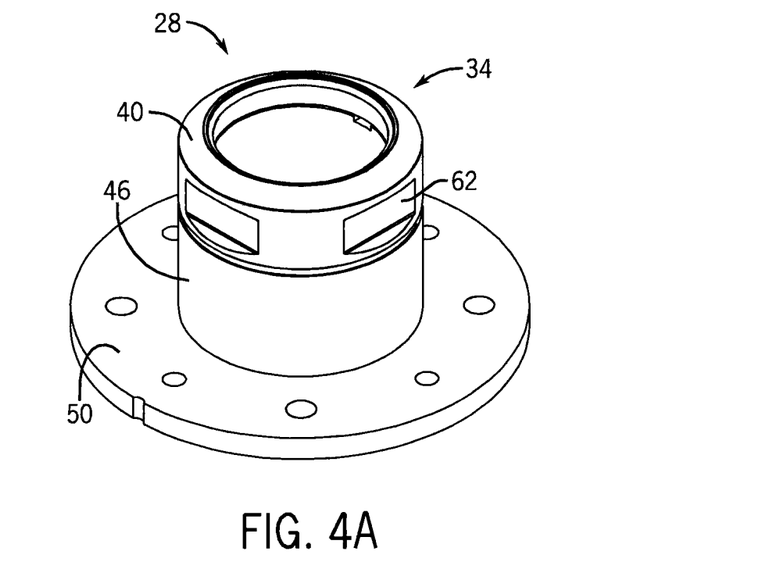
FIGS. 4A and 4B are perspective views of a fixed flange and a swivel flange, respectively, for use with the suspension system.
Figure 4B:
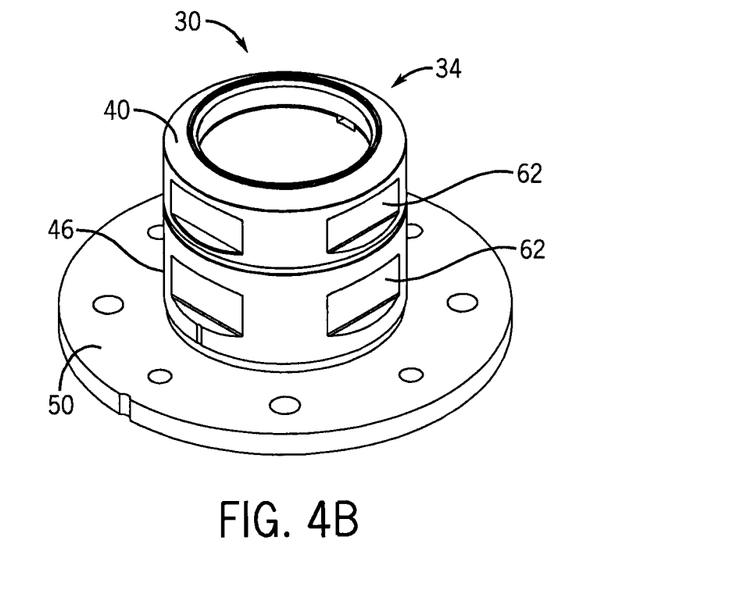

The support mounting assembly 14 can include a fixed flange 28, as shown in FIG. 4A, or a swivel flange 30, as shown in FIG. 4B. In some embodiments, as shown in FIGS. 1 and 2, the support mounting assembly 14 can permit floor mounting of the suspension system 10. In other embodiments, the support mounting assembly 14 can permit wall mounting of the suspension system 10, as shown in FIG. 3, ceiling mounting of the suspension system 10, or mounting of the suspension system 10 to a surface of an industrial machine or other equipment. The fixed flange 28 or the swivel flange 30 can be compression fittings which can be directly coupled to a connector tube 26, as further described below. In addition, in some embodiments, the enclosure mounting assembly 12 can include an enclosure adapter 32, as shown in FIGS. 1-3, which can be coupled to a connector tube 26 via a coupling 18, 20. In other embodiments, the fixed flange 28 or the swivel flange 30 can be coupled to the enclosure 22 as an enclosure mounting assembly 12. The fixed flanges 28, the swivel flanges 30, the enclosure adapter 32, the connector tubes 26, and the couplings 18, 20 can be substantially hollow to permit routing of cables (not shown) through the suspension system 10 to the enclosure 22. Also, as shown in FIGS. 1 and 2, the suspension system 10 can include a protective and/or decorative cover 33 over the fixed flange 28 (or the swivel flange 30).

In some embodiments, the connector tubes 26 can include straight connector tubes, as shown in FIGS. 1 and 2, U-shaped connector tubes, as shown in FIG. 1, and/or L-shaped connector tubes, as shown in FIG. 3. One or more of the different-shaped connector tubes 26 can be coupled to the support mounting assembly 14 and the enclosure mounting assembly 12 in order to help position the enclosure 22 at a desired position.

Figure 5A:
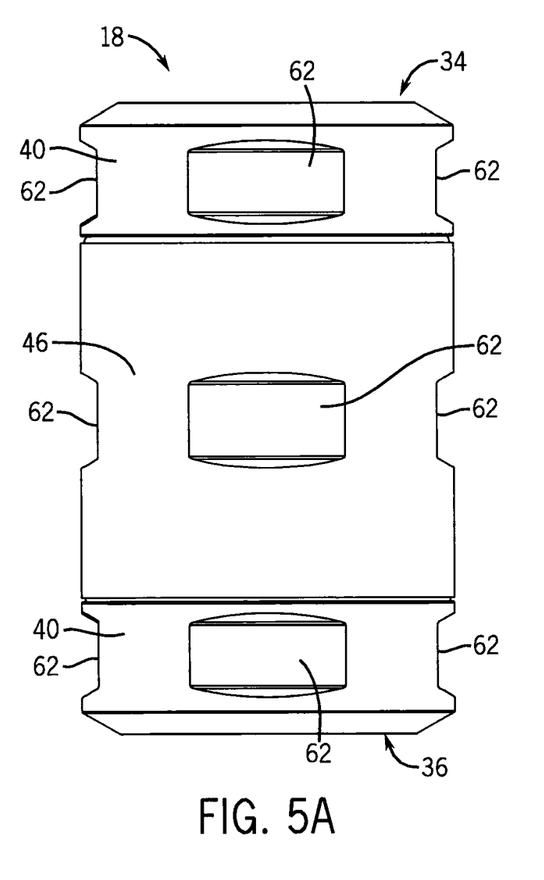
FIGS. 5A and 5B are a side view and a partially exploded perspective view, respectively, of a fixed coupling for use with a suspension system according to one embodiment of the invention.
Figures 5B, 6B:
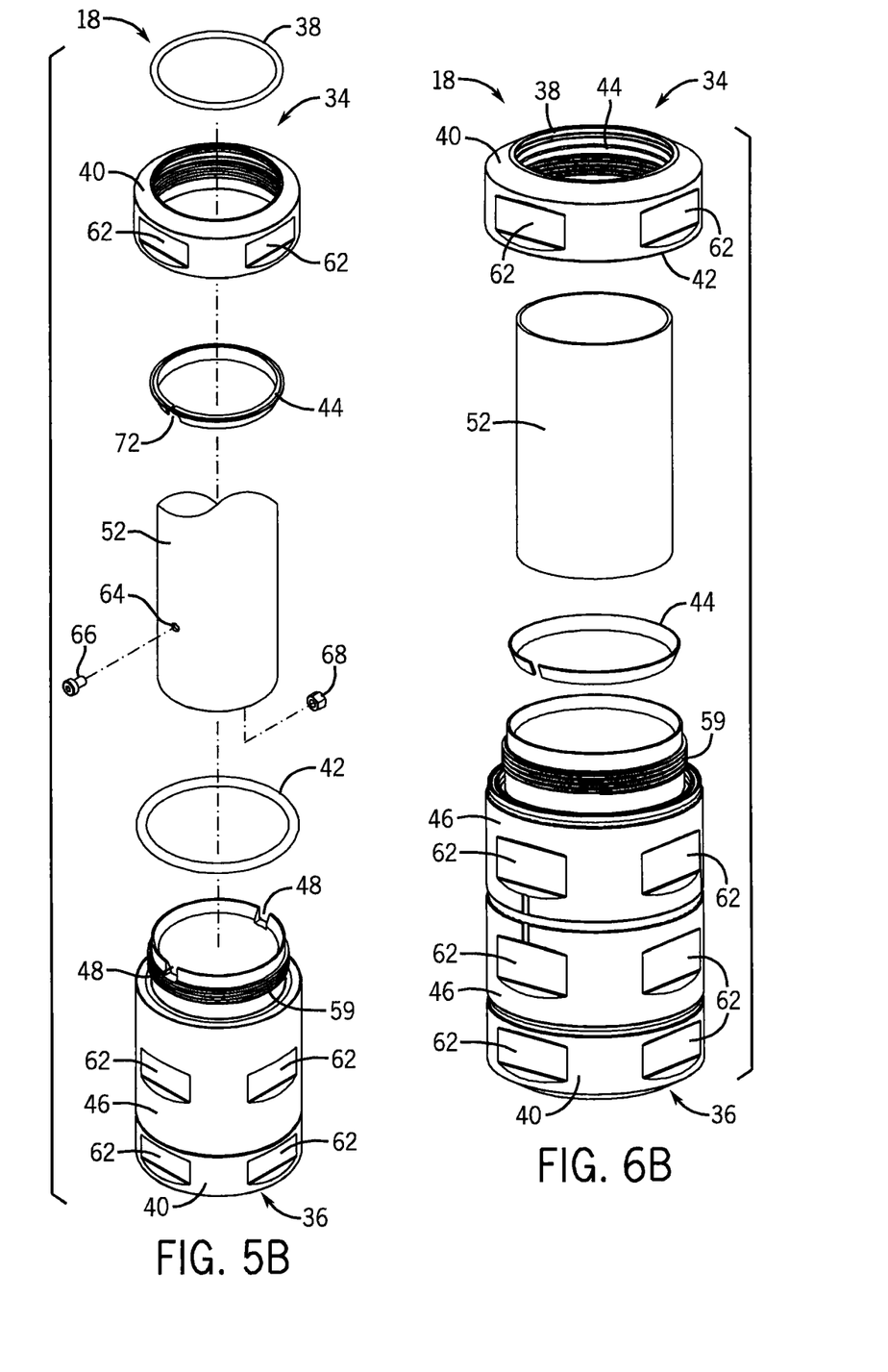
FIGS. 6A and 6B are a side view and a partially exploded perspective view, respectively, of a fixed coupling for use with a suspension system according to another embodiment of the invention.

FIGS. 5A and 5B illustrate the fixed coupling 18 according to one embodiment of the invention. The fixed coupling 18 can be a compression fitting that secures two parts together. In one example, the two parts can include the enclosure mounting assembly 12 and a connector tube 26, as shown in FIGS. 2 and 3. In another example, the two parts can include two connector tubes 26, as shown in FIG. 1. Once coupled together by the fixed coupling 18, the two parts may not move or twist relative to each other, as described below.

As shown in FIG. 5B, the fixed coupling 18 can include a first end 34 and an identical second end 36. Both the first end 34 and the second end 36 can include an o-ring tube seal 38, a compression nut 40, an o-ring nut seal 42, and a slit compression ring 44. A single, fixed coupling body 46 can substantially prevent the first end 34 and the second end 36 from twisting or rotating relative to one another. As shown in FIG. 5B, the fixed coupling body 46 can include one or more notches 48, as further described below. In addition, the fixed flange 28 can include a first end 34 with the above-mentioned components and a fixed coupling body 46 extending from a platform 50, as shown in FIG. 4A.

Figure 6A:
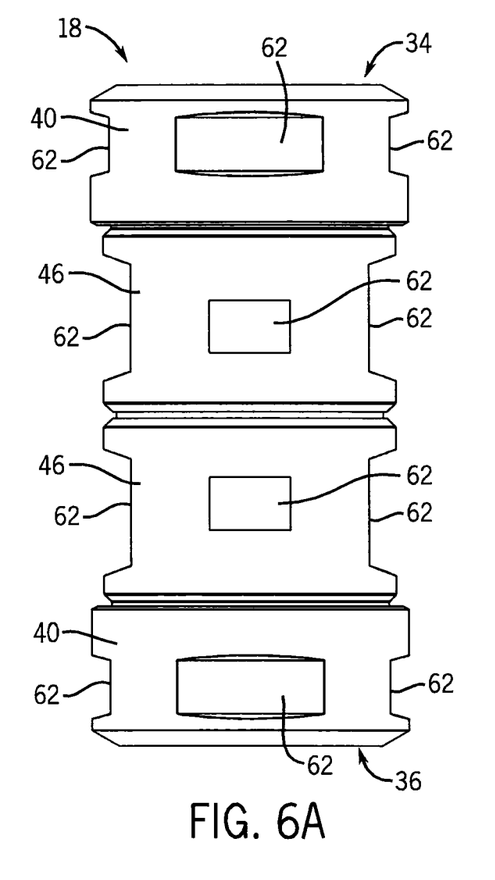

FIGS. 6A and 6B show the fixed coupling 18 according to another embodiment of the invention. The fixed coupling 18 of FIGS. 6A and 6B can include the above-mentioned components of the first end 34 and the second end 36, such as the o-ring tube seal 38, the compression nut 40, the o-ring nut seal 42, and the slit compression ring 44. In addition, the fixed coupling 18 of FIGS. 6A and 6B can include separate coupling bodies 46, without notches 48, fixed together to prevent rotation between the first end 34 and the second end 36.

Figure 7A:
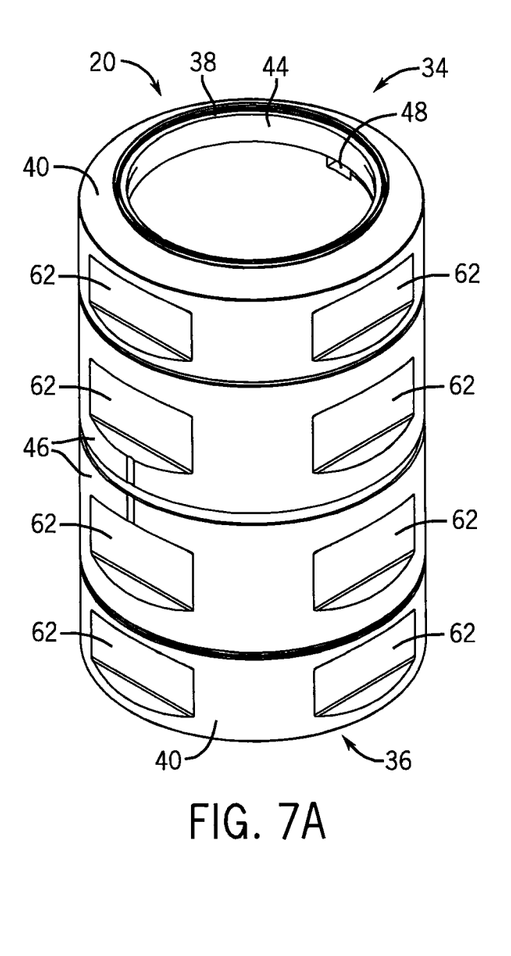
FIGS. 7A-7C are perspective, exploded, and side cross-sectional views, respectively, of a swivel coupling for use with a suspension system according to one embodiment of the invention.
Figure 7B:
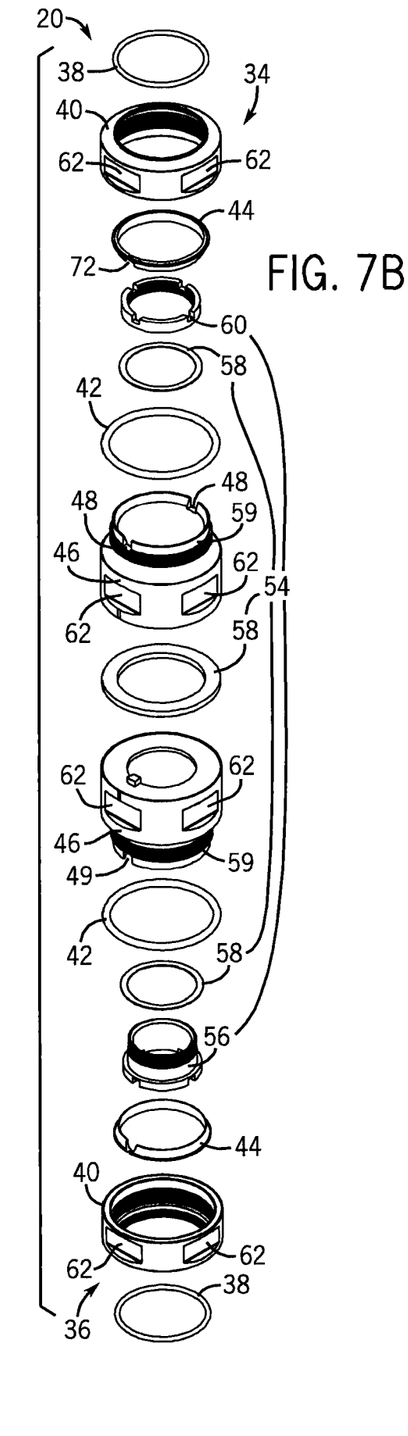
Figure 7C:
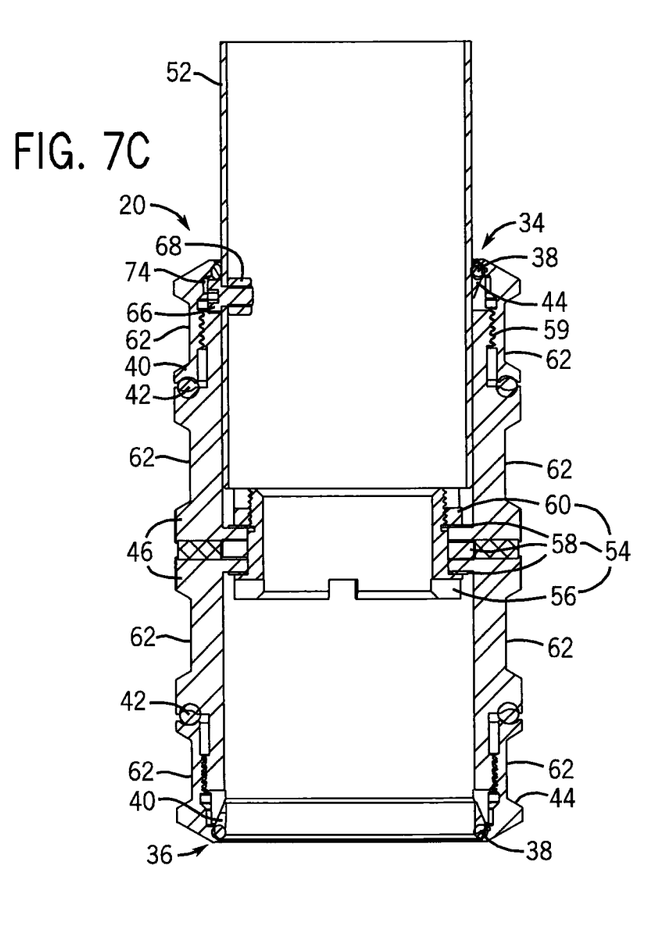

FIGS. 7A-7C illustrate the swivel coupling 20 according to one embodiment of the invention. The swivel coupling 20 can be a compression fitting that secures two parts together. In one example, the two parts can include the enclosure mounting assembly 12 and a connector tube 26, as shown in FIGS. 2 and 3. In another example, the two parts can include two connector tubes 26, as shown in FIG. 1. Once coupled together by the swivel coupling 20, the two parts can move or twist relative to each other along a longitudinal axis of the swivel coupling 20, as described below.

As shown in FIGS. 7B and 7C, the swivel coupling 20 can include a first end 34 and a second end 36. Similar to the fixed coupling 18, both the first end 34 and the second end 36 of the swivel coupling 20 can include an o-ring tube seal 38, a compression nut 40, an o-ring nut seal 42, a slit compression ring 44. In addition, both the first end 34 and the second end 36 of the swivel coupling 20 can include separate, swivel coupling bodies 46 with notches 48. The two swivel coupling bodies 46 can allow the first end 34 and the second end 36 to twist or rotate relative to one another. In addition, the swivel flange 30 can include a first end 34 with the above-mentioned components and a swivel coupling body 46 extending from a platform 50, as shown in FIG. 4B. The swivel coupling bodies 46 of the swivel coupling 20 can be rotated relative to one another and the swivel coupling body 46 of the swivel flange 30 can be rotated relative to the platform 50, as described below.

As shown in FIGS. 7B and 7C, the coupling bodies 46 of the first end 34 and the second end 36 can be coupled together by a locking assembly 54. In addition, the swivel coupling body 46 of the swivel flange 30 can be coupled to the platform 50 by a similar locking assembly (not shown). The locking assembly 54 can include a threaded sleeve 56, bearing washers 58, and a retaining nut 60. The threaded sleeve 56 can include a locking patch to prevent unscrewing of the coupling bodies 46, but still allow the coupling bodies 46 to rotate relative to one another. In some embodiments, the swivel coupling 20 and/or the swivel flange 30 can allow up to about 330 degrees of rotation and can include rotation stops to prevent rotation past about 330 degrees. In addition, in some embodiments, the swivel coupling 20 can be adjusted for load and freedom of movement by adjusting the retaining nut 60. In one embodiment, the fixed coupling 18 (e.g., the fixed coupling 18 as shown in FIGS. 6A and 6B) can include the locking assembly 54 with the above-mentioned components fixed together to prevent rotation of the separate coupling bodies 46.

Figure 8A:
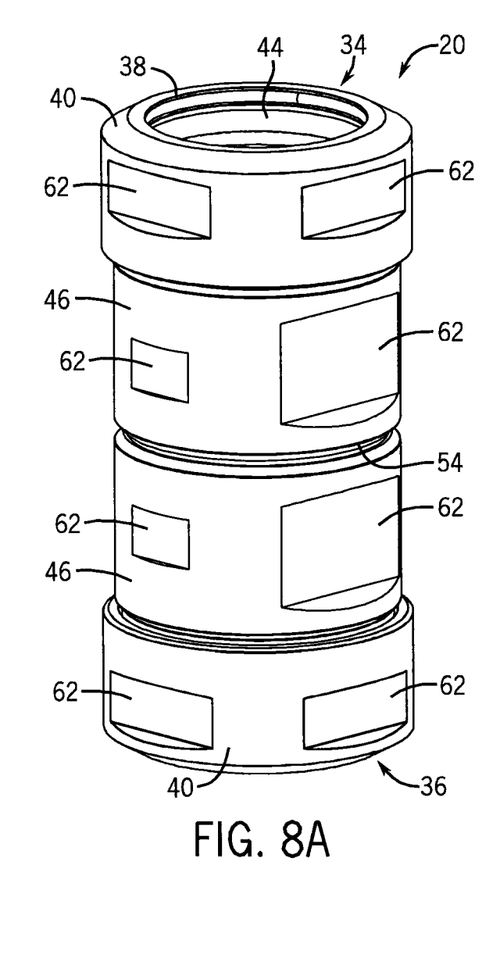
FIGS. 8A-8C are perspective, exploded, and side cross-sectional views, respectively, of a swivel coupling for use with a suspension system according to another embodiment of the invention.
Figure 8B:
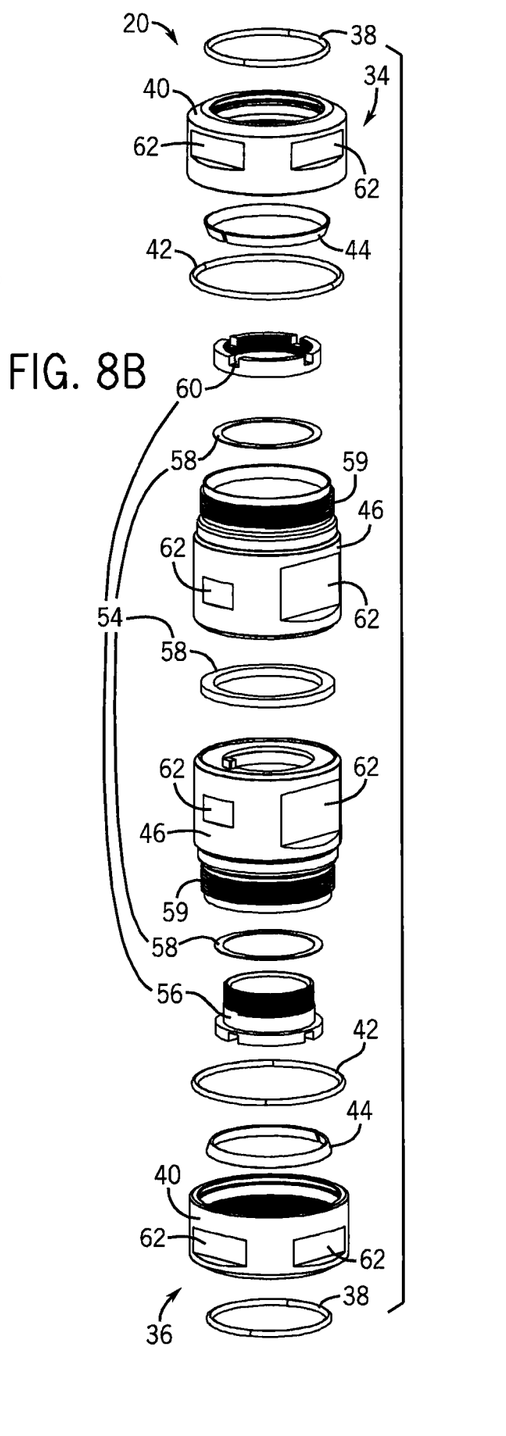
Figure 8C:
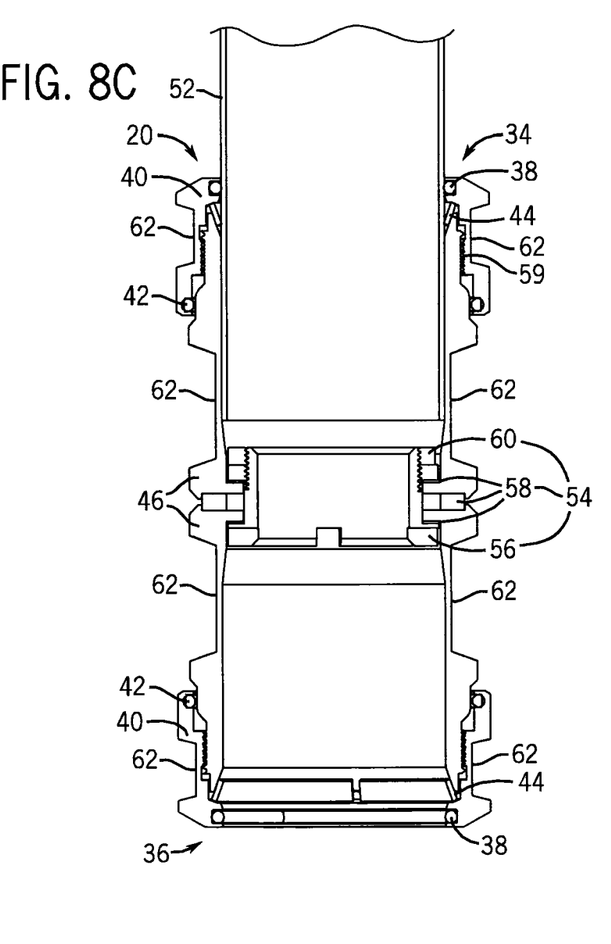

FIGS. 8A-8C show the swivel coupling 20 according to another embodiment of the invention. The swivel coupling 20 of FIGS. 8A-8C can include the above-mentioned components of the first end 34 and the second end 36, such as the o-ring tube seal 38, the compression nut 40, the o-ring nut seal 42, the slit compression ring 44, and swivel coupling bodies 46 without notches 48.

The fixed coupling 18, the swivel coupling 20, the fixed flange 28, and the swivel flange 30 of FIGS. 4A-8C can be coupled to a system component, such as a connector tube 26 or an enclosure adapter 32, as described below. For example, FIG. 1 shows a first connector tube 26 coupled to a fixed flange 28 and one end of a swivel coupling 20, a second connector tube 26 connected to another end of the swivel coupling 20 and one end of a fixed coupling 18, and an enclosure adapter 32 coupled to another end of the fixed coupling 18. FIG. 2 shows a connector tube 26 coupled to a fixed flange 28 and a first end of a swivel coupling 20, and an enclosure adapter 32 coupled to a second end of the swivel coupling 20. FIG. 3 shows a connector tube 26 coupled to a fixed flange 28 and a first end of a swivel coupling 20, and an enclosure adapter 32 coupled to a second end of the swivel coupling 20. The fixed coupling 18, the swivel coupling 20, the fixed flange 28, or the swivel flange 30 can be coupled to a part as described below.

As shown in FIGS. 5B, 6B, 7C, and 8C, a coupling end portion 52 of one of the connector tubes 26 or the enclosure adapter 32 can be at least partially fixed inside a first end 34 (or a second end 36) of one of the couplings 18, 20. The coupling end portion 52 can be inserted into the coupling body 46 and the compression ring 44 can be positioned between a portion of the coupling end portion 52 and a portion of the coupling body 46. The compression nut 40 can be threaded to engage threading 59 on the coupling body 46 and can be tightened against the compression ring 44 over the coupling body 46. Tightening the compression nut 40 against the compression ring 44 can force the compression ring 44 to taper into the coupling body 46. As a result, the compression ring 44 can compress against the coupling end portion 52, which can help center and secure the coupling end portion 52 within the coupling body 46. The compression nut 40 and/or the coupling body 46 can include flat plane indents 62 so that a wrench (not shown) can be used to tighten the compression nut 40 and/or the coupling body 46. The compression ring 44 can be compressed and tapered into the coupling body 46 more or less depending on a diameter of the coupling end portion 52, which can help compensate for varying tube connector diameters in some applications.

Figure 9A:
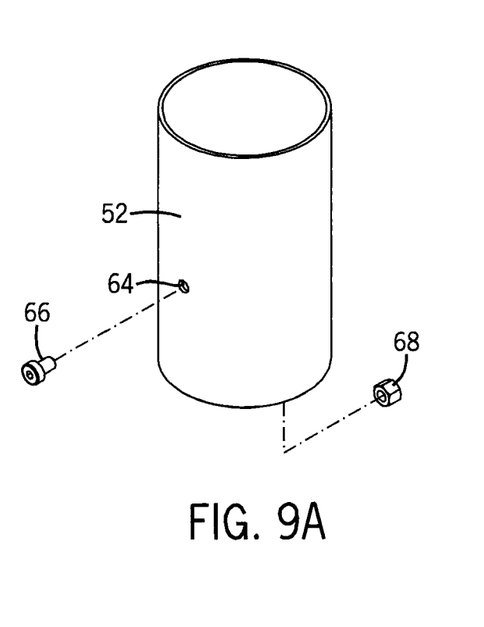
FIG. 9A is a perspective exploded view of a coupling end portion of a component of a suspension system.
Figure 9B:
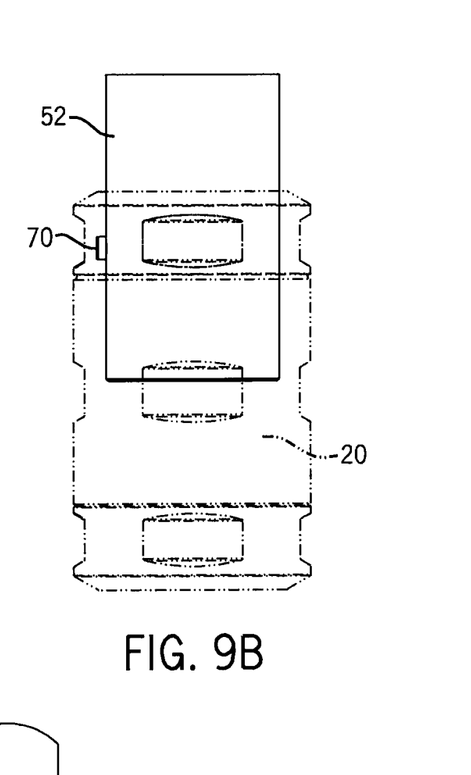
FIG. 9B is a side view of the coupling end portion of FIG. 9A inserted within a coupling of the suspension system.

In some embodiments, as shown in FIG. 9A, the coupling end portions 52 can include one or more slots 64 and a screw 66 can be positioned within each slot 64 and secured in place by a nut 68. As shown in FIG. 9B, when the screw 66 is secured within the slot 64, a head of the screw 66 can form a protrusion 70 extending outward from the coupling end portion 52. The slot 64, the screw 66, and the nut 68 can help secure the coupling end portion 52 within a coupling body 46 when a compression nut 40 is tightened around the coupling body 46, as shown in FIG. 7C. For example, the coupling end portion 52 can be slid into the coupling body 46 (e.g., of the fixed coupling 18 of FIGS. 5A-5B, the swivel coupling 20 of FIGS. 7A-7C, the fixed flange 28, or the swivel flange 30) so that the protrusion 70 can be positioned within the notch 48 of the coupling body 46. By securing the protrusion 70 within the notch 48 (e.g., by tightening the compression nut 40 over the coupling body 46), the coupling end portion 52 can be prevented from twisting or rotating within to the coupling body 46. In some embodiments, the protrusion 70 can be formed by other components. As shown in FIGS. 5B and 7B, in some embodiments, the compression ring 44 can also include a notch 72 to accommodate its positioning around the coupling body 46 without interference by the protrusion 70. In addition, as shown in FIG. 7C, when the compression nut 40 is tightened around the coupling body 46, the protrusion 70 can be substantially secured within the notch 48 by a ridge 74 of the compression nut 40 (e.g., the ridge 74 can substantially abut the protrusion 70 when the compression nut 40 is tightened over the coupling body 46). The ridge 74 can help prevent the coupling end portion 52 from sliding outward from the coupling body 46 under large loads.

As described above, the interior of the fixed coupling 18, the swivel coupling 20, the fixed flange 28, and the swivel flange 30 can be hollow to permit the routing of cables through the suspension system 10 to the enclosure 22. Since the compression ring 44 is tightened against the coupling end portion 52, there is substantially continuous contact around the circumference of the coupling end portion 52, as opposed to conventional fittings that only have point contact at set screw locations. This substantially continuous contact around the coupling end portion 52 can help substantially center the coupling end portion 52 within the coupling 16 or the flange 28, 30 and prevent movement and/or sag of the connector tube 26 or enclosure adapter 32. In addition, the o-ring seals 38, 42, and/or the bearing washers 58, can help provide a water-tight seal between the interior of the suspension system 10 (i.e., inside the connector tubes 26, the couplings 18, 20, the flanges 28, 30, the enclosure adapter 32, etc.) and the outside environment at connection points between the couplings 18, 20, the flanges 28, 30, the enclosure adapter 32, and the connector tubes 26. The water-tight seal can seal out moisture, such as water from high-pressure, high-temperature washdowns, as well as contaminants, such as bacteria and dust, from the interior of the suspension system 10, allowing the suspension system 10 to maintain NEMA type 4 and IP69K ratings. In addition, since there are no screw hubs or inserts, there are fewer external catch points that can harbor bacteria compared to conventional fittings. In some embodiments, one or more components of the suspension system 10, such as the couplings 18, 20, as well as the connector tubes 26, the enclosure mounting assembly 12, and the support mounting assembly 14 can be constructed of type 304 stainless steel.

Figure 10:
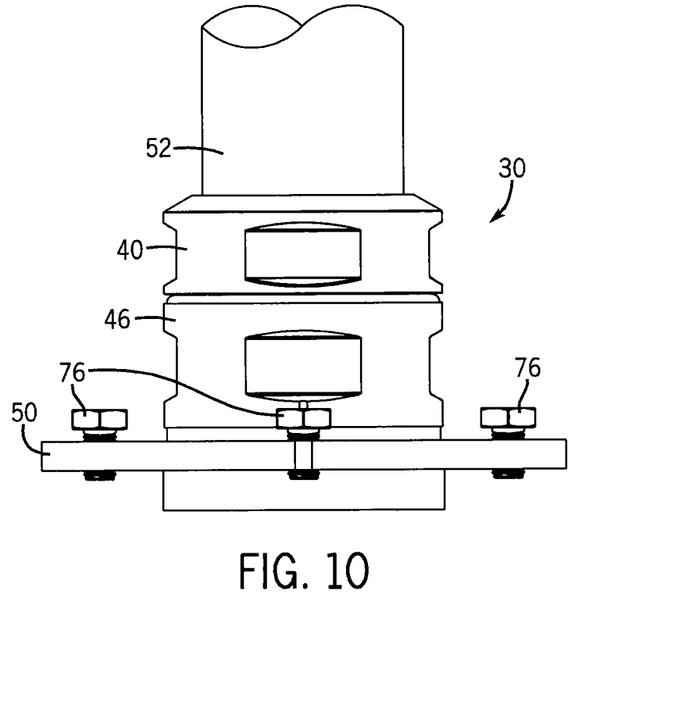
FIG. 10 is a side view of the swivel flange of FIG. 4B.

The support assembly (i.e., the couplings 18, 20 and the support mounting assembly 14) can act as a load bearing member for the suspension system 10. In some embodiments, the support assembly can withstand up to between about 100-pound loads and about 135-pound loads. With heavier loads, the support assembly can maintain the rigidity of the suspension system 10, as compared to conventional set screw-type fittings which tend to sag with heavier loads. For example, the fixed flange 28 and the swivel flange 30 (as shown in FIG. 10) can include leveling screws 46 through the platforms 50. The leveling screws 46 can help compensate for slanted or uneven mounting surfaces. In addition, the leveling screws 76 can compensate for flexing of the connector tubes 26 due to heavy loads in order to keep the enclosure 22 at a desired position. As a result, due to adjustment of the leveling screws 76, the enclosure 22 can be kept substantially level in relation to the mounting surface even though one or more of the connector tubes 26 is flexing under the load.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A compression fitting for securing a coupling end portion of an enclosure suspension system component, the compression fitting comprising:
    a first coupling body receiving the coupling end portion, the first coupling body including a threaded portion and a notch;
    a first compression ring positioned between a portion of the coupling end portion and a portion of the first coupling body;
    a first compression nut tightened over the threaded portion of the first coupling body and forcing the first compression ring against the coupling end portion, the first compression nut securing a protrusion of the coupling end portion within the notch of the first coupling body to prevent rotation of the coupling end portion within the first coupling body;
    a second compression ring and a second compression nut tightened over the first coupling body;
    wherein the first coupling portion is inserted into the at least one coupling body and substantially fixed within the at least one coupling body by the first compression nut tightened over the at least one coupling body, and the second coupling portion is inserted into the at least one coupling body and substantially fixed within the at least one coupling body by the second compression nut tightened over the at least one coupling body; and
    wherein the first compression nut and the second compression nut each include flat plane indents to receive a wrench in order to tighten the first compression nut against the at least on coupling body and to tighten the second compression nut against the at least one coupling body.

2. The compression fitting of claim 1, wherein the first compression ring forced against the coupling end portion centers the coupling end portion within the first coupling body.

3. The compression fitting of claim 1, wherein the first compression nut includes a ridge abutting the protrusion to substantially prevent the coupling end portion from sliding out of the first coupling end body.

4. The compression fitting of claim 1, and further comprising a second coupling body coupled to and rotatable about the first coupling body wherein the second compression ring and the second compression nut are tightened over the second coupling body.

5. The compression fitting of claim 1, and further comprising a platform, wherein the first coupling body is coupled to a platform and is one of fixed and rotatable relative to the platform.

6. A suspension system for supporting an enclosure, the system comprising:
    an enclosure mounting assembly with a first coupling portion;
    a connector tube with a second coupling portion;
    a compression fitting including a first end and a second end, the compression fitting coupling the enclosure mounting assembly to the connector tube by fixing the first coupling portion inside the first end of the compression fitting and fixing the second coupling portion inside the second end of the compression fitting, the compression fitting providing a substantially sealed pathway between the first coupling portion and the second coupling portion;
    wherein the compression fitting includes at least one coupling body, a first compression nut, a second compression nut, a first compression ring, and a second compression ring;
    wherein the first coupling portion is inserted into the at least one coupling body and substantially fixed within the at least one coupling body by the first compression nut tightened over the at least one coupling body, and the second coupling portion is inserted into the at least one coupling body and substantially fixed within the at least one coupling body by the second compression nut tightened over the at least one coupling body; and
    wherein the first compression nut and the second compression nut each include flat plane indents to receive a wrench in order to tighten the first compression nut against the at least one coupling body and to tighten the second compression nut against the at least one coupling body.

7. A suspension system for supporting an enclosure, the system comprising:
    an enclosure mounting assembly with a first coupling portion;
    a connector tube with a second coupling portion;
    a compression fitting including a first end, a second end, at least one coupling body, a first compression nut, a second compression nut, a first compression ring, and a second compression ring, the compression fitting coupling the enclosure mounting assembly to the connector tube by fixing the first coupling portion inside the first end of the compression fitting and fixing the second coupling portion inside the second end of the compression fitting, the compression fitting providing a substantially sealed pathway between the first coupling portion and the second coupling portion;
    wherein the first coupling portion is inserted into the at least one coupling body and substantially fixed within the at least one coupling body by the first compression nut tightened over the at least one coupling body, and the second coupling portion is inserted into the at least one coupling body and substantially fixed within the at least one coupling body by the second compression nut tightened over the at least one coupling body; and
    wherein the first coupling portion includes a slot with a screw positioned in the slot, the screw being secured in the slot by a nut, wherein the at least one coupling body includes a notch to receive a head of the screw protruding from the coupling portion, the screw received in the notch substantially prevents twisting of the first coupling portion within the at least one coupling body.

8. The system of claim 6, wherein the first compression nut includes threading which can engage threading of the at least one coupling body in order to tighten the first compression nut over the at least one coupling body, and the second compression nut includes threading which can engage threading of the at least one coupling body in order to tighten the second compression nut over the at least one coupling body.

9. The system of claim 6, wherein the first compression ring is tapered into the at least one coupling body to substantially center the first coupling portion within the at least one coupling body when the first compression nut is tightened over the at least one coupling body and the second compression ring is tapered into the at least one coupling body to substantially center the second coupling portion within the at least one coupling body when the second compression nut is tightened over the at least one coupling body.

10. The system of claim 6, wherein the at least one coupling body includes a first coupling body and the second coupling body coupled together through a locking assembly which allows rotation of the first coupling body and the second coupling body relative to one another.

11. The system of claim 10, wherein the locking assembly permits up to about 330 degrees of rotation of the first coupling body and the second coupling body relative to one another.

12. The system of claim 6, wherein the first compression nut includes a first o-ring to seal a connection point between the first compression nut and the at least one coupling body, and the second compression nut includes a second o-ring to seal a connection point between the second compression nut and the at least one coupling body.

13. The system of claim 6, wherein the enclosure mounting assembly is adapted to be coupled to the enclosure and the compression fitting provides the substantially sealed pathway between the first coupling portion and the second coupling portion for routing cables connecting to the enclosure.

14. The system of claim 6, wherein the compression fitting provides a substantially sealed pathway between the first coupling portion and the second coupling portion to substantially prevent water from entering one of the first coupling portion and the second coupling portion during a high-pressure, high-temperature washdown procedure.

15. The system of claim 6, wherein the compression fitting provides a substantially sealed pathway between the first coupling portion and the second coupling portion to substantially prevent dust and bacteria from entering one of the first coupling portion and the second coupling portion.

16. The system of claim 6, wherein the compression fitting maintains a coupling between the enclosure mounting assembly and the connector tube when the enclosure mounting assembly includes a load up to about 135 pounds.

17. The system of claim 6, and further comprising a support mounting assembly, wherein the support mounting assembly includes one of a fixed flange and a swivel flange including a compression fitting capable of being coupled to a third coupling portion of the connector tube, wherein the third coupling portion is opposite the second coupling portion.

18. A suspension system for supporting an enclosure, the system comprising:
an enclosure mounting assembly with a first coupling portion;
a support mounting assembly with a first compression fitting;
at least one hollow connector tube positioned between the enclosure mounting assembly and the support mounting assembly, a first end of the at least one hollow connector tube being coupled to the support mounting assembly by the first compression fitting, the first compression fitting providing a substantially sealed pathway between the support mounting assembly and the at least one hollow connector tube;
a second compression fitting that couples the enclosure mounting assembly to a second end of the at least one hollow connector tube, the second compression fitting providing a substantially sealed pathway between the first coupling portion and the at least one hollow connector tube;
wherein the first compression fitting includes a first compression nut and a first compression ring and the second compression fitting includes a second compression nut and a second compression ring;
wherein the first compression nut and the second compression nut each include flat plane indents to receive a wrench in order to tighten the first compression nut against the a first end of the at least one hollow connector tube and to tighten the second compression nut against the second end of the at least one hollow connector tube.

19. The system of claim 18, wherein the at least one hollow connector tube is one of a straight connector tube, an L-shaped connector tube, and a U-shaped connector tube.

* * * * *